United States Patent Office 3,227,571
Patented Jan. 4, 1966

3,227,571
CARBOXYMETHYLATED AND ACYLATED, CARBOXYMETHYLATED GELATINS FOR PEPTIZATION OF BARYTA
Paul E. Miller, Carl R. Haefele, and John W. Gates, Jr., all of Rochester, N.Y., assignors to Eastman Kodak Company, Rochester, N.Y., a corporation of New Jersey
No Drawing. Filed July 10, 1961, Ser. No. 122,643
10 Claims. (Cl. 106—135)

This invention relates to dispersions of barium sulfate in carboxymethylated gelatins and in acylated, carboxymethylated gelatins. It also relates to acylated, carboxymethylated gelatins per se.

Photographic paper is commonly prepared by coating paper base with a layer of barium sulfate suspended in gelatin solution and applying a photosensitive emulsion layer thereover. The composition, from which the layer of barium sulfate suspended in gelatin solution is applied, may also contain hardener, antifoamer, dye and spreading agent. The gelatin acts as a peptizer and binder for the barium sulfate and other addenda. Previously, only certain hide gelatins have been employed for this peptizing and binding function. Dispersions of barium sulfate in other gelatins, such as pigskin gelatin, bone gelatin and some hide gelatins, give uncoatable agglomerations. This invention is based on the observation that dispersions of barium sulfate in carboxymethylated, or acylated, carboxymethylated gelatins exhibit a markedly less tendency to agglomerate than when dispersed in corresponding unmodified gelatins.

One object of our invention is to peptize barium sulfate with carboxymethylated gelatin. Another object of our invention is to peptize barium sulfate with acylated, carboxymethylated gelatin. A further object of our invention is to prepare a paper coating composition by dispersing barium sulfate in carboxymethylated gelatin. A still further object of our invention is to prepare a paper coating composition by dispersing barium sulfate in acylated, carboxymethylated gelatin. A still further object of our invention is to provide new compositions of matter. Still another object of our invention is to provide a process for preparing acylated, carboxymethylated gelatins. Other objects of our invention will appear herein.

We have found that baryta emulsions having a "BE viscosity" (defined hereinafter) of 18–32 seconds comprising barium sulfate suspended in carboxymethylated gelatin, or acylated, carboxymethylated gelatin, produces eminently satisfactory coating compositions. The tendency of a mixture of barium sulfate in gelatin to agglomerate is reduced if carboxymethylated, or acylated and carboxymethylated gelatin is used. The response of carboxymethylated gelatins to hardener is greater than the unmodified gelatin, thereby allowing a reduction in the amount of hardener employed in baryta compositions using carboxymethyl gelatins.

Gelatins may be carboxymethylated by treatment with an α-halo aliphatic acid at a pH greater than 8.5 by the method described in U.S. patent application No. 773,837 of Gates, Lovett and Miller, filed November 14, 1958, and now abandoned. Gelatins, including carboxymethylated gelatins, may be acylated by adjusting the reaction solution to a pH of about 10 with a suitable base, such as sodium hydroxide, adding lower fatty acid anhydride and after about 15 minutes adding sulfuric acid to reduce the pH to about 6. The product may then be chilled, sliced and washed.

The following examples will illustrate a method of acylating and carboxymethylating gelatins. Although pigskin gelatin is used as the starting material in the examples, the method works equally well with other gelatins, such as bone gelatin and hide gelatin.

EXAMPLE 1

400 grams of a second run pigskin gelatin was plumped and melted in 4 liters of distilled water. At 50° C., 20 grams of bromoacetic acid dissolved in 100 ml. of hot water was added while the pH of the solution was maintained at 10 with the addition of sodium hydroxide. The pH of the solution was maintained at 10 for 30 minutes after which 16 grams of acetic anhydride was added and a pH of 10 maintained for 15 minutes. Sulfuric acid was added to bring the pH to 6.0. The gelatin was chilled, sliced and washed 3 hours in chilled running water, and dried in the usual manner. The carboxymethyl content of the gelatin was 2.12%, and the acetyl content was 2%.

EXAMPLE 2

200 grams of a second run pigskin gelatin was plumped and melted in 2 liters of distilled water. At 50° C., 14 grams of chloroacetic acid dissolved in 50 ml. of hot water was added while the pH of the solution was maintained at 10 with the addition of sodium hydroxide. The pH of the solution was maintained at 10 for 30 minutes after whcih 8 grams of acetic anhydride was added and a pH of 10 maintained for 15 minutes. Sulfuric acid was added to bring the pH of the gelatin solution to 6.0. The gelatin was chilled, sliced and washed 3 hours in chilled running water, and dried in the usual manner. The carboxymethyl content of the gelatin was 4.36% and, the acetyl content was 2%.

The tendency of a dispersion of barium sulfate in gelatin to agglomerate may be advantageously measured by the "BE viscosity" of the dispersion. The BE viscosity is the time in seconds required for 50 ml. of a baryta emulsion, consisting of one part of dry gelatin to 10 parts of dry blanc fixé (barium sulfate in water), adjusted to contain 37% solids, to pass through a BE drainage pipette, which is a 1-inch glass tube drawn to a capillary tip through which 50 ml. of water will pass in about 7 seconds. A BE viscosity of over approximately 32 seconds indicates that the dispersion of barium sulfate in a particular gelatin will agglomerate to such an extent that it cannot be employed in coating processes. On the other hand, a BE viscosity of at least 18 second is desirable, since solutions of a lesser viscosity are ordinarily too thin to provide a satisfactory coat. BE viscosities in the range of 20–28 seconds are particularly suitable.

Examples 3–12 demonstrate that dispersions of barium sulfate in carboxymethylated gelatins and acylated, carboxymethylated gelatins produce useful baryta emulsions. In these examples, the gelatin to be tested was soaked in cold water for one hour and dissolved at a temperature of 160° F. Blanc fixé was added thereto in the proportion of one part of dried gelatin to 10 parts of dry blanc fixé. Hardener, defoaming agent and dye were then added.

The final suspension was adjusted to 37% solids. These gelatins were tested and the results are given in Tables I, II and III.

*Table I.—Hide gelatin*

| Example | Gelatin | BE viscosity | Jelly strength [1] |
|---|---|---|---|
| 3 | Untreated 4th run | 35.2 | |
| | 3.83% Carboxymethyl (CM) | 30.6 | |
| | 4.25% CM | 32.2 | |
| | 5.10% CM | 29.0 | |
| | 6.38% CM | 28.0 | |
| | 8.50% CM | 26.6 | |
| 4 | Untreated 4th run | 75.0 | |
| | 4.25% CM | 27.0 | |
| 5 | Untreated 5th run | 24.6 | 102 |
| | 4.25% CM | 20.0 | 98 |
| 6 | Untreated 4th run | 26.8 | 79 |
| | 4.25% CM | 21.2 | 70 |

[1] The "jelly strength" is in terms of Shoom and was determined according to the procedure laid down by the National Association of Glue Manufacturers in the U.S.A., and described in British Standards Specification No. 757 of 1937 except that the jelly solution was 6.1% rather than 6.6% by weight. This results in readings about 10% below the Bloom method. A gelatin having a jelly strength in the range of 65–285 may be used in baryta compositions.

Referring to the table set out above, it may be seen in Examples 3 and 4 that the baryta solution peptized with untreated hide gelatin tended to agglomerate to such an extent that it could not be employed satisfactorily as a coating emulsion, but that a baryta solution peptized with the same gelatin which had been carboxymethylated resulted in a coatable baryta emulsion. In Examples 5 and 6, the baryta emulsion comprising untreated gelatin was a satisfactory peptizer for the barium sulfate, but the baryta emulsions comprising the carboxymethylated counterpart of the untreated gelatin produced a baryta emulsion which showed a reduction in the tendency of the barium sulfate and the gelatin to agglomerate. Moreover, in Example 5, the baryta composition comprising the 4.25% carboxymethylated hide gelatin required only 4.6 cc. of hardener, whereas the baryta composition comprising the untreated gelatin required an excess of 7 cc. of hardener to obtain a satisfactory baryta emulsion. Similarly, in Example 6, 5.3 cc. of hardener was needed for the untreated hide gelatin baryta composition, but only 2.34 cc. was needed for the corresponding 4.25% carboxymethylated hide gelatin baryta composition.

*Table II.—Pigskin gelatin*

| Example | Gelatin | BE Viscosity | Jelly Strength |
|---|---|---|---|
| 7 | Untreated 3rd run (Acid extracted) | 34.0 | 192 |
| | 2.12% CM | 24.2 | 199 |
| 8 | Untreated 2nd run | 81.3 | 254 |
| | 2.12% CM | 26.5 | 242 |
| | 3.18% CM | 24.8 | 221 |
| | 4.24% CM | 22.8 | 216 |
| 9 | Untreated 2nd run | 48 | 250 |
| | 2.12% CM | 26.9 | 243 |
| | 3.18% CM | 22.7 | 238 |
| | 4.24% CM | 25.4 | 221 |
| 10 | Untreated 2nd run | 123 | 284 |
| | 2.12% CM, 2% Acetyl (AC) | 18.5 | 190 |
| | 4.36% CM, 2% AC | 18 | 196 |
| | 6.23% CM, 2% AC | 19 | 197 |
| 11 | Untreated 2nd run | 168 | 276 |
| | 2.12% CM, 1% AC | 31 | 234 |
| | 2.12% CM, 2% AC | 27 | 232 |
| | 2.12% CM, 3% AC | 25 | 221 |
| | 3.4% CM, 1% AC | 28 | 223 |
| | 3.4% CM, 2% AC | 25 | 207 |
| | 3.4% CM, 3% AC | 22 | 193 |

In the above table, it may be seen in Examples 7–9 that the untreated gelatins which were tested failed to satisfactorily peptize the barium sulfate, but that the carboxymethylated counterparts of the gelatins were in each instance satisfactory peptizers and binders for the barium sulfate. Similarly, the untreated gelatins tested in Examples 10 and 11 produced uncoatable agglomerations when mixed with barium sulfate, but the acetylated and carboxymethylated counterparts of these gelatins were satisfactory peptizers and binders for barium sulfate.

*Table III.—Bone gelatin*

| Example | Gelatin | BE Viscosity | Jelly Strength |
|---|---|---|---|
| 12 | Untreated, blend of 1st and 2nd runs | 34.5 | 266 |
| | 2.12% CM | 27.4 | 268 |
| | 2.12% CM, 3% AC | 24.2 | 240 |
| | 2.12% CM, 4% AC | 23.2 | 228 |
| | 2.12% CM, 5% AC | 18.6 | 206 |

Example 12 shows that a low viscosity bone gelatin produced an uncoatable agglomeration when mixed with barium sulfate, but that the carboxymethylated counterpart of this gelatin was a satisfactory peptizer and binder for the barium sulfate. Carboxymethylation plus acetylation of this gelatin yielded a still more satisfactory peptizer and binder for the barium sulfate precipitates.

The following examples demonstrate the use of gelatins treated in accordance with our invention as peptizers and binders for barium sulfate.

EXAMPLE 13

A 45% paste consisting of 9.6 parts of barium sulfate precipitates in water (blanc fixé) and 1 part of 3% acetylated, 3.4% carboxymethylated pigskin gelatin was blended in a water jacketed, sigma bladed mixer with hardener, anti-foamer, dye and spreading agent. The baryta emulsion had a BE viscosity of approximately 25 seconds and did not agglomerate. It was coated out at a 37% solids concentration at the rate of 26 gm./m.$^2$ as a wet coat onto a standard photographic paper and dried by passing through a heated tunnel. The paper base obtained had a baryta coating thereon which was satisfactory in all respects.

EXAMPLE 14

A baryta composition prepared as in Example 13 was reduced to 35% solids concentration and was spread at 20 gm./m.$^2$ as a wet coat onto a standard photographic paper and dried by passing through a heated tunnel. The paper base obtained had a baryta coating thereon which was satisfactory in all respects.

EXAMPLE 15

A 45% paste consisting of 12.8 parts of blanc fixé and 1 part of 2% acetylated pigskin gelatin having a carboxymethyl content of 2.12%, which would have a BE viscosity at 37% solids concentration of approximately 20 seconds, was blended in a water jacketed, sigma bladed mixer with hardener, anti-foamer, dye and spreading agent. It was coated, spread and dried as in Examples 13 and 14. The paper bases obtained had baryta coatings thereon which were satisfactory in all respects.

EXAMPLE 16

Baryta compositions prepared as in Examples 13, 14 and 15 were thickened to 45% solids concentration and spread on photographic paper at approximately 54 gm./m.$^2$ as a wet coat, and dried in a heated tunnel. The paper bases obtained had baryta coatings thereon which were satisfactory in all respects.

The baryta compositions prepared in accordance with Examples 13–16 may be coated on a photographic paper and dried by any normal spreading technique used in the coating industry. Emulsions comprising blanc fixé suspended in carboxymethylated or acylated carboxymethylated hide or bone gelatins may be satisfactorily coated in the same manner. Suitable ranges of carboxymethylated or acylated, carboxymethylated gelatin to blanc fixé are 1:9.6 to 1:16.

We prefer to coat with baryta emulsions which contain about 34% to about 45% solids, although wider ranges of solids content may be employed, such as about 30% to about 50%. It should be noted, however, that the term "BE viscosity" as used in this description and in the claims is by definition a test wherein baryta emulsions are adjusted to contain 37% solids. Thus, our invention is broadly applicable to baryta emulsions containing about 30% to about 50% solids which would have a BE viscosity, at the 37% solids concentration, of about 18 to about 32 seconds.

As mentioned above, a baryta emulsion having a BE viscosity over 32 seconds tends to agglomerate and cannot be coated satisfactorily; however, the BE viscosity should be at least 18 seconds. A BE viscosity in the range of 20–28 seconds is particularly suitable. Useful baryta compositions having a BE viscosity of 18–32 seconds may be prepared employing as the peptizer and binder therein a gelatin to which has been imparted a carboxymethyl content of 1–15% and an acyl content of 0–10%. The generally preferred range of carboxymethyl content is 2–10% and the preferred range of acylation, where used, is 2–8%. Particularly desirable results are realized when the acyl group is an acetyl group. However, acyl groups of 2–4 carbon atoms are generally satisfactory.

As indicated heretofore, untreated hide gelatin having a BE viscosity of no more than 32 seconds when mixed with barium sulfate, may be further improved as a peptizing and binding agent for barium sulfate by imparting a carboxymethyl content thereto. In these cases, a carboxymethyl content of about 4.5% is especially useful, although considerably wider ranges, say 2–10%, of carboxymethyl content may be employed with satisfactory results. With such gelatins, acylation may not be required to achieve the desired improvement but may be desirable in some instances.

In general, our invention is applicable to suspensions of barium sulfate in a carboxymethylated, or acylated, carboxymethylated gelatin of low or medium viscosity. The use of carboxymethylated or acylated and carboxymethylated gelatins as peptizers and binders for barium sulfate has advantages additional to the advantage of enabling one to employ gelatins not heretofore regarded as useful as peptizers and binders for barium sulfate. For example, in most cases, carboxymethylated gelatins or carboxymethylated and acylated gelatins for baryta compositions allow a reduction in the amount of hardener required. Another advantage in the use of carboxymethylated gelatins as peptizers and binders for barium sulfate is extension of the gelatin time. Thus, the emulsion may be held for a longer time prior to coating.

Previous efforts have been made to reduce the interaction between gelatin and barium sulfate. Addition of amino-containing chemicals, such as hydroxylamine, hydroxylamine sulfate and amino-containing water-dispersible polyamide resins (e.g., the cationic polyamide-epichlorohydrin resins described in U.S. Patents 2,926,116 and 2,926,154) to gelatins with borderline reactivity, such as calfskin gelatin, decreases the residual reactivity and improves hardening properties in gel-baryta applications. However, these agents do not reduce the reactivity of pigskin gelatin with barium sulfate sufficiently to make it feasible as a peptizer and binder for baryta.

Although the invention has been described in considerable detail with reference to certain preferred embodiments thereof, it will be understood that variations and modifications can be made within the spirit and scope of the invention as described hereinabove and as defined in the appended claims.

We claim:

1. A baryta emulsion having a BE viscosity of 18–32 seconds comprising 9.6–16 parts of barium sulfate suspended in 1–15% carboxymethylated gelatin, the suspension having a BE viscosity of 18–32 seconds.

2. A baryta emulsion having a BE viscosity of 18–32 seconds comprising 9.6–16 parts of barium sulfate suspended in 2–8% acylated, 1–15% carboxymethylated gelatin, the suspension having a BE viscosity of 18–32 seconds.

3. A baryta emulsion having a BE viscosity of 18–32 seconds comprising 9.6–16 parts of barium sulfate suspended in 1–15% carboxymethylated pigskin gelatin, the suspension having a BE viscosity of 18–32 seconds.

4. A baryta emulsion having a BE viscosity of 18–32 seconds comprising 9.6–16 parts of barium sulfate suspended in 2–8% acylated, 1–15% carboxymethylated pigskin gelatin, the suspension having a BE viscosity of 18–32 seconds.

5. A photographic paper coating composition comprising a suspension of 9.6–16 parts of barium sulfate in one part of 1–15% carboxymethylated, 0–10% acylated gelatin, the suspension having a BE viscosity of 18–32 seconds.

6. A photographic paper coating composition comprising a suspension of 9.6–16 parts of barium sulfate in one part of 2–10% carboxymethylated, 2–8% acylated gelatin, the suspension having a BE viscosity of 18–32 seconds.

7. A photographic paper coating composition comprising a suspension of 9.6–16 parts of barium sulfate in one part of 1–15% carboxymethylated, 0–10% acylated pigskin gelatin, the suspension having a BE viscosity of 18–32 seconds.

8. A photographic paper coating composition comprising a suspension of 9.6–16 parts of barium sulfate in one part of 2–10% carboxymethylated, 2–8% acylated pigskin gelatin, the suspension having a BE viscosity of 18–32 seconds.

9. A paper having thereon a coating containing 9.6–16 parts of barium sulfate and one part of 0–10% acylated, 1–15% carboxymethylated gelatin.

10. Claim 9 wherein the gelatin is pigskin gelatin.

References Cited by the Examiner
UNITED STATES PATENTS

| | | | |
|---|---|---|---|
| 2,728,759 | 12/1955 | Keil | 260—112 |
| 2,729,628 | 1/1956 | Mann | 260—123.5 |
| 2,776,219 | 1/1957 | Hoyt et al. | 106—128 |
| 2,780,560 | 2/1957 | Hanley | 117—156 |
| 2,788,336 | 4/1957 | Uhing et al. | 260—112 X |
| 2,805,161 | 9/1957 | Wood | 106—131 |
| 2,823,123 | 2/1958 | Knox et al. | 96—94 |
| 2,868,661 | 1/1959 | Tschentke et al. | 106—135 |
| 2,875,054 | 2/1959 | Griggs et al. | 106—135 |
| 3,010,838 | 11/1961 | Uber | 106—128 |
| 3,011,890 | 12/1961 | Gates et al. | 96—94 |
| 3,138,581 | 6/1964 | Young et al. | 260—112 |

ALEXANDER H. BRODMERKEL, *Primary Examiner.*

JOHN R. SPECK, MORRIS LIEBMAN, *Examiners.*